UNITED STATES PATENT OFFICE.

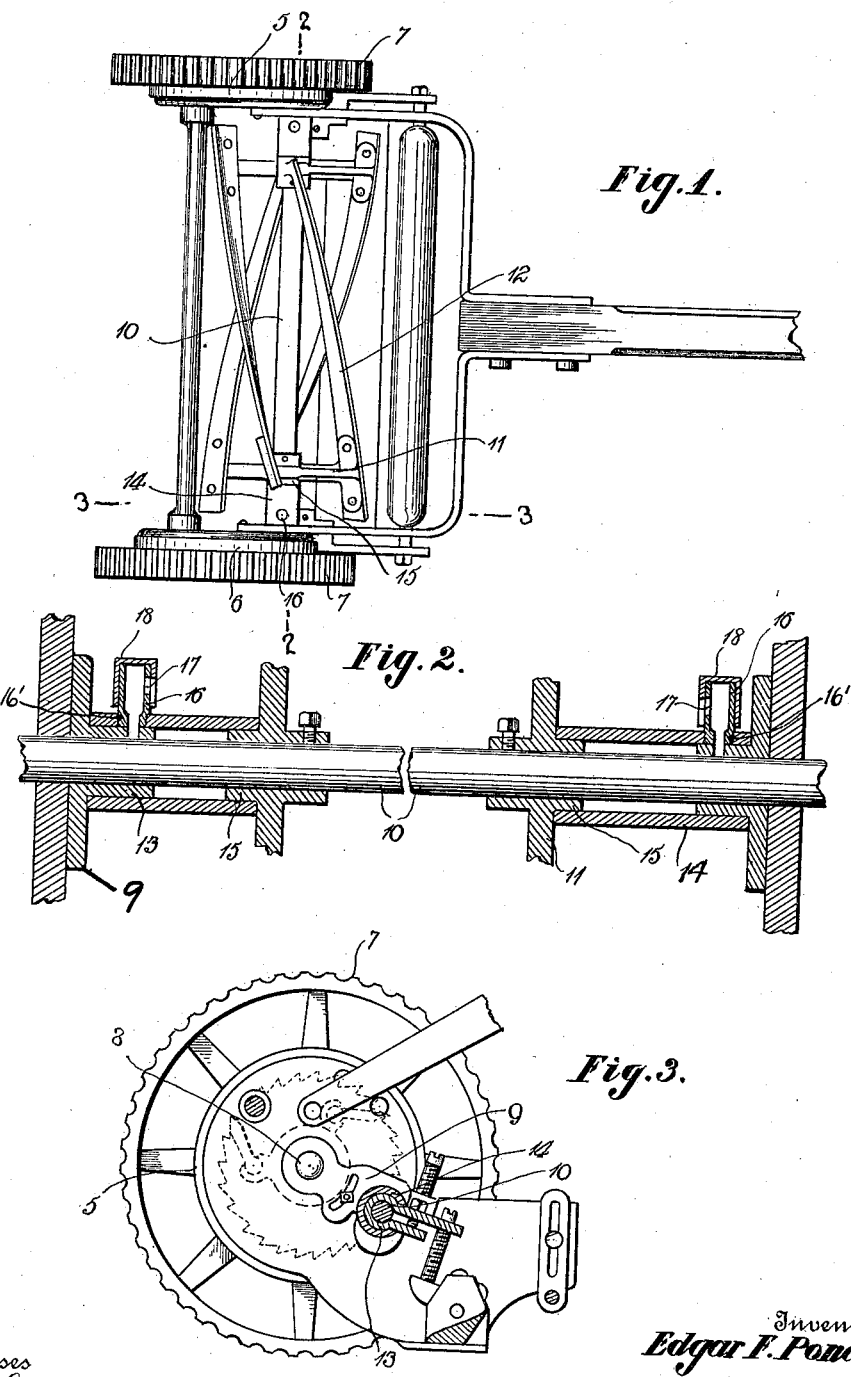

EDGAR F. POND, OF SOUTH MILFORD, MASSACHUSETTS.

LAWN-MOWER.

981,684.

Specification of Letters Patent. Patented Jan. 17, 1911.

Application filed December 10, 1909. Serial No. 532,375.

*To all whom it may concern:*

Be it known that I, EDGAR F. POND, a citizen of the United States, residing at South Milford, in the county of Worcester, State of Massachusetts, have invented certain new and useful Improvements in Lawn-Mowers; and I do hereby declare the following to be a full, clear, and exact description of the invention, such as will enable others skilled in the art to which it appertains to make and use the same.

The invention relates to a lawn mower and more particularly to the class of attachments for lawn mowers.

The primary object of the invention is the provision of an attachment of this character in which the extremities of the rotary cutter shaft of a lawn mower are protected by means of a sleeve so that during the rotation of the cutter blades of said mower there will be no possibility of grass or weeds wrapping about the extremities of the cutter shaft which would necessarily result in an imperfect operation of the lawn mower.

Another object of the invention is the provision of an attachment in which the extremities of the cutter shaft are protected and prevented from being clogged by grass wrapping about the same and also that will enable the ready and easy oiling of the bearings supporting or receiving the cutter shaft.

A further object of the invention is the provision of an attachment of this character in which the bearings for the cutter shaft of a lawn mower are protected from weeds and grass severed by the rotary cutters and that will enable the bearings to be supplied with oil for lubricating the shaft without possibility of grit or other foreign matter gaining access to the bearings.

With these and other objects in view, the invention consists in the construction, combination and arrangement of parts as will be hereinafter more fully described, illustrated in the accompanying drawings, which disclose the preferred form of embodiment of the invention, to enable those skilled in the art to practice the same and as pointed out in the claim hereunto appended.

In the drawings:—Figure 1 is a fragmentary top plan view of a lawn mower with the invention applied thereto. Fig. 2 is a vertical transverse sectional view on the line 2—2 of Fig. 1. Fig. 3 is a sectional view on the line 3—3 of Fig. 1.

Similar reference characters indicate corresponding parts throughout the several views in the drawings.

Referring to the drawings by numerals 5 and 6 designate the side frames of a lawn mower each mounted in the usual manner upon ground wheels 7, by means of stud spindles or axles 8, and to these spindles or axles are connected castings forming hangers 9, in which is journaled a rotary cutter shaft 10, the latter having fixed thereto spiders 11, to which are connected curved cutter blades 12, which are of the usual well known construction, the cutter shaft being rotated through the medium of one of the supporting wheels in the ordinary manner. Each of the castings 9, is formed with a split hub 13, projecting inwardly therefrom and this hub serves as a bearing for the rotary cutter shaft 10, of the lawn mower. The attachment comprises sleeves 14, each of which is suitably cut away to snugly surround the hub 13, of the castings 9, and also being of a sufficient length to surround the annular shoulder 15, of the adjacent spider 11, supporting the cutter blades of the lawn mower. These sleeves 14, form a housing to close the gaps between the annular shoulders 15, and the hubs 13, so as to prevent the wrapping of grass or weeds about the rotatable shaft during the operation of the rotary cutter blades of the lawn mower.

Contained in the hubs 13, at their upper portions are suitable apertures which register with suitable apertures in the sleeves 14, and in these latter apertures are threaded the lower ends of oil cups 16 provided with threaded nipples 16', containing inlet apertures 17, to permit the introduction of oil therein and these apertures are normally closed by rotatable caps 18, mounted upon the oil cups. These threaded nipples 16' are engaged in the apertures formed in the sleeves 14 so that the inner ends of the said nipples will engage the hubs 13 to securely fasten the said sleeves 14 thereto. Therefore by use of these oil cups 16, the lubricant will be freely supplied to the rotary cutter shaft 10, by reason of the fact that the lubricant passes from the oil cups into the hubs 13, in which the rotary cutter shaft 10, is journaled.

From the foregoing, the construction and operation of the invention will be clearly understood without the necessity of a more extended explanation.

What is claimed is:—

In a lawn mower, the combination with the side frames, of castings connected with the frames and having split sleeves, a rotary shaft journaled in the said sleeves, spiders fixed to the shaft and having hubs spaced from the said sleeves, blades fixed to the said spiders, the said sleeves being provided with apertures, tubiform members surrounding the said hubs and sleeves to close the spaces therebetween, and oil cups threaded in the said members to engage the said split sleeves for fastening the said members thereto and also registering with said apertures for feeding lubricant to the shaft into the spaces between the said sleeves and hubs.

In testimony whereof, I affix my signature, in presence of two witnesses.

EDGAR F. POND.

Witnesses:
GEORGE A. WILCOX,
WILLIAM P. CLARKE.